(12) United States Patent
Yu

(10) Patent No.: US 12,423,931 B2
(45) Date of Patent: Sep. 23, 2025

(54) SIMULATION SCENE IMAGE GENERATION METHOD, ELECTRONIC DEVICE AND STORAGE MEDIUM

(71) Applicant: UISEE (SHANGHAI) AUTOMOTIVE TECHNOLOGIES LTD, Shanghai (CN)

(72) Inventor: Haiyong Yu, Shanghai (CN)

(73) Assignee: UISEE (SHANGHAI) AUTOMOTIVE TECHNOLOGIES LTD, Shanghai (CN)

(*) Notice: Subject to any disclaimer, the term of this patent is extended or adjusted under 35 U.S.C. 154(b) by 0 days.

(21) Appl. No.: 17/915,486

(22) PCT Filed: Nov. 22, 2019

(86) PCT No.: PCT/CN2019/120408
§ 371 (c)(1),
(2) Date: Sep. 29, 2022

(87) PCT Pub. No.: WO2021/097845
PCT Pub. Date: May 27, 2021

(65) Prior Publication Data
US 2025/0225748 A1     Jul. 10, 2025

(51) Int. Cl.
*G06T 19/00* (2011.01)
*G06T 17/00* (2006.01)
(Continued)

(52) U.S. Cl.
CPC ............ *G06T 19/20* (2013.01); *G06T 17/00* (2013.01); *G06V 10/7715* (2022.01);
(Continued)

(58) Field of Classification Search
None
See application file for complete search history.

(56) References Cited

U.S. PATENT DOCUMENTS 6,587,576 B1 * 7/2003 Wesolkowski .......... G06T 7/194
382/170
10,424,064 B2 * 9/2019 Price ........................ G06N 3/08
(Continued)

FOREIGN PATENT DOCUMENTS

CN    108564126 A    9/2018
CN    109447897 A    3/2019
(Continued)

OTHER PUBLICATIONS

Yin Ming, et al., Image super-resolution reconstruction based on NSPT domain CNN-SC, Journal of Optoelectronics-Lase, Aug. 2017, pp. 919-925, vol. 28 Issue 8.

*Primary Examiner* — Martin Mushambo
(74) *Attorney, Agent, or Firm* — Bayramoglu Law Offices LLC

(57) ABSTRACT

A simulation scene image generation method, an electronic device and a storage medium are provided. The method includes: acquiring semantic segmentation information and instance segmentation information of a white blank 3D environment model; receiving instance text information of the white blank 3D environment model, the instance text information being editable information and used for describing an instance attribute; and generating a simulation scene image based on the semantic segmentation information, the instance segmentation information, the instance text information and a pre-trained generative adversarial network. In the method, only the establishment of the white blank 3D environment model is required, so that the simulation scene image can be generated based on the semantic segmentation information and the instance segmentation information of the white blank 3D environment model, and attributes such as color, texture and illumination do not need to be refined
(Continued)

during establishment of the scene, thereby improving a generation efficiency.

18 Claims, 5 Drawing Sheets

(51) Int. Cl.
    *G06T 19/20*     (2011.01)
    *G06V 10/77*     (2022.01)
    *G06V 10/82*     (2022.01)
    *G06V 20/70*     (2022.01)

(52) U.S. Cl.
    CPC .............. *G06V 10/82* (2022.01); *G06V 20/70* (2022.01); *G06T 2219/2016* (2013.01)

(56) References Cited

U.S. PATENT DOCUMENTS

| | | | | |
|---|---|---|---|---|
| 10,650,278 | B1* | 5/2020 | Ho | G06V 10/26 |
| 10,762,650 | B1* | 9/2020 | Guo | G06T 5/00 |
| 10,984,286 | B2* | 4/2021 | Dundar | G06V 10/955 |
| 11,022,693 | B1* | 6/2021 | Allais | G06V 10/82 |
| 11,430,123 | B2* | 8/2022 | Kohl | A61B 5/0033 |
| 11,461,644 | B2* | 10/2022 | Vahdat | G06N 3/045 |
| 11,580,673 | B1* | 2/2023 | Ren | G06N 3/0464 |
| 2002/0136449 | A1* | 9/2002 | Park | G06V 10/56 |
| | | | | 382/164 |
| 2010/0329542 | A1* | 12/2010 | Ramalingam | G06T 7/80 |
| | | | | 348/118 |
| 2011/0279453 | A1* | 11/2011 | Murphy | H04L 67/52 |
| | | | | 345/420 |
| 2014/0172296 | A1* | 6/2014 | Shtukater | G01C 21/3647 |
| | | | | 701/408 |
| 2015/0139545 | A1* | 5/2015 | Guntur | G06T 7/246 |
| | | | | 382/170 |
| 2015/0371440 | A1* | 12/2015 | Pirchheim | G06T 7/33 |
| | | | | 345/419 |
| 2016/0154999 | A1* | 6/2016 | Fan | G06T 7/155 |
| | | | | 382/103 |
| 2018/0047208 | A1* | 2/2018 | Marin | H04N 13/257 |
| 2018/0158235 | A1* | 6/2018 | Wu | G06T 19/20 |
| 2018/0259970 | A1* | 9/2018 | Wang | G06N 3/04 |
| 2018/0260669 | A1 | 9/2018 | Konishi | |
| 2019/0108639 | A1* | 4/2019 | Tchapmi | G06N 3/044 |
| 2019/0147320 | A1* | 5/2019 | Mattyus | G06V 20/182 |
| | | | | 382/155 |
| 2019/0147582 | A1* | 5/2019 | Lee | G06T 11/00 |
| | | | | 382/156 |
| 2019/0244060 | A1* | 8/2019 | Dundar | G06T 15/00 |
| 2019/0266442 | A1* | 8/2019 | Malur Srinivasan | G06V 10/82 |
| 2019/0325640 | A1* | 10/2019 | Jiddi | G06T 17/00 |
| 2019/0347804 | A1* | 11/2019 | Kim | G06T 7/194 |
| 2020/0082219 | A1* | 3/2020 | Li | G01S 7/417 |
| 2020/0111263 | A1* | 4/2020 | Huang | G06Q 30/0643 |
| 2020/0151497 | A1* | 5/2020 | Kojima | G06T 7/11 |
| 2020/0210721 | A1* | 7/2020 | Goel | G06V 10/82 |
| 2020/0258207 | A1* | 8/2020 | Gros | G06T 7/40 |
| 2020/0364247 | A1* | 11/2020 | Van Sickle | G06V 10/82 |
| 2020/0372243 | A1* | 11/2020 | Tai | G06N 3/084 |
| 2021/0049780 | A1* | 2/2021 | Westmacot | G01C 21/30 |
| 2021/0101624 | A1* | 4/2021 | Philbin | G06F 18/251 |
| 2021/0103285 | A1* | 4/2021 | Philbin | G05D 1/617 |
| 2021/0142577 | A1* | 5/2021 | Thomas | G06V 20/647 |
| 2021/0303923 | A1* | 9/2021 | Lee | G06T 17/00 |
| 2021/0304516 | A1* | 9/2021 | Lee | G06V 10/54 |
| 2021/0390770 | A1* | 12/2021 | Kuo | G06V 40/165 |
| 2022/0292685 | A1* | 9/2022 | Heisler | G06T 7/11 |

FOREIGN PATENT DOCUMENTS

| | | |
|---|---|---|
| CN | 109472365 A | 3/2019 |
| CN | 110378284 A | 10/2019 |
| CN | 110443863 A | 11/2019 |
| JP | 2006323450 A | 11/2006 |

\* cited by examiner

SIMULATION SCENE IMAGE GENERATION METHOD, ELECTRONIC DEVICE AND STORAGE MEDIUM

CROSS REFERENCE TO THE RELATED APPLICATIONS

This application is the national phase entry of International Application No. PCT/CN2019/120408, filed on Nov. 22, 2019, the entire contents of which are incorporated herein by reference.

TECHNICAL FIELD

The present disclosure relates to the technical field of vehicles, and more particularly, to a simulation scene image generation method, an electronic device and a storage medium.

BACKGROUND

Simulation is currently an important part of technology exploration and technology verification testing in the research and development process of artificial intelligence technologies such as smart driving and robots. Especially in the current smart driving field, simulation scenes may generate massive amounts of training data to train computer vision algorithms (target detection recognition, segmentation, tracking, or the like) and decision algorithms (imitation learning and reinforcement learning, or the like), as well as provide almost unlimited algorithm verification testing scenes in the later stage.

For the training and verification of computer vision algorithm, it is necessary to build a simulation scene. However, at present, a process of building a simulation scene is as follows: to spend a lot of manpower and resources to go to the scene for mapping first, and then manually build models and refine details such as color, texture, lighting and the like in a simulation engine based on the mapping data. It can be seen that the process of building the simulation scene is tedious, time-consuming and inefficient, and the scalability of the built simulation scene is poor and the rendering of the simulation engine requires high equipment hardware and software.

The description of the discovery process of the above problems is only used to assist in understanding the technical solutions of the present disclosure, and does not represent an admission that the above contents belong to the prior art.

SUMMARY

In order to solve at least one problem of the prior art, at least one embodiment of the present disclosure provides a simulation scene image generation method, an electronic device and a storage medium.

In a first aspect, the embodiments of the present disclosure provide a simulation scene image generation method. The method includes:
  acquiring semantic segmentation information and instance segmentation information of a white blank 3D environment model;
  receiving instance text information of the white blank 3D environment model, the instance text information being editable information and used for describing an instance attribute; and
  generating a simulation scene image based on the semantic segmentation information, the instance segmentation information, the instance text information and a pre-trained generative adversarial network.

In a second aspect, the embodiments of the present disclosure also provide an electronic device, including: a processor and a memory; the processor being configured for executing the steps of the method according to the first aspect by calling a program or instruction stored in the memory.

In a third aspect, the embodiments of the present disclosure also provide a non-transient computer-readable storage medium for storing a program or instruction, and the program or instruction enables a computer to execute the steps of the method according to the first aspect.

It can be seen that in at least one of the embodiments of the present disclosure, only the establishment of the white blank 3D environment model is required, so that the simulation scene image can be generated based on the semantic segmentation information and the instance segmentation information of the white blank 3D environment model, and attributes such as color, texture and illumination do not need to be refined in the process of establishing the scene, thereby improving a generation efficiency; moreover, the instance text information is editable, and different pieces of instance text information describe different instance attributes and correspond to different instances, such that the simulation scene is diversified.

BRIEF DESCRIPTION OF THE DRAWINGS

In order to illustrate the technical solutions in the embodiments of the present disclosure more clearly, the accompanying drawings used in the description of the embodiments or the prior art will be briefly described below. Obviously, the accompanying drawings in the following description are merely some embodiments of the present disclosure. Those of ordinary skills in the art can also obtain other accompanying drawings according to these accompanying drawings.

DETAILED DESCRIPTION OF THE EMBODIMENTS

In order to make the above objects, features and advantages of the present disclosure be more clearly understood, the present disclosure will be described in further detail below with reference to the drawings and embodiments. It may be understood that the described embodiments are merely a part of, rather than all of, the embodiments of the present disclosure. The specific embodiments described herein are merely illustrative of the present disclosure and are not intended to limit the present disclosure. Based on the embodiments of the present disclosure described, all the other embodiments obtained by a person of ordinary skills in the art shall fall within the scope of protection of the present disclosure.

It should be noted that relational terms herein such as "first" and "second" and the like, are used merely to distinguish one entity or operation from another entity or operation, and do not necessarily require or imply there is any such relationship or order between these entities or operations.

At present, a process of building a simulation scenes is as follows: to spend a lot of manpower and resources to go to the scene for mapping first, and then manually build models and refine details such as color, texture, lighting and the like in a simulation engine based on the mapping data. It can be seen that the process of building the simulation scene is tedious, time-consuming and inefficient, and the scalability of the built simulation scene is poor and the rendering of the simulation engine requires high equipment hardware and software. The embodiments of the present disclosure provide a simulation scene image generation solution, which only requires to establish only a white blank 3D environment model, so that a simulation scene image can be generated based on semantic segmentation information and instance segmentation information of the white blank 3D environment model, and attributes such as color, texture and illumination do not need to be refined in the process of establishing the scene, thereby improving a generation efficiency; moreover, the instance text information is editable, and different pieces of instance text information describe different instance attributes and correspond to different instances, such that the simulation scene is diversified.

In some embodiments, the simulation scene image generation solution provided by the embodiments of the present disclosure may be applied to electronic devices. The simulation scene is, for example, a smart driving simulation scene, and the simulation scene is, for example, a simulation scene generated by a simulation engine. In some embodiments, the simulation engine may include, but is not limited to, Unreal Engine, Unity, or the like.

Figure 1:
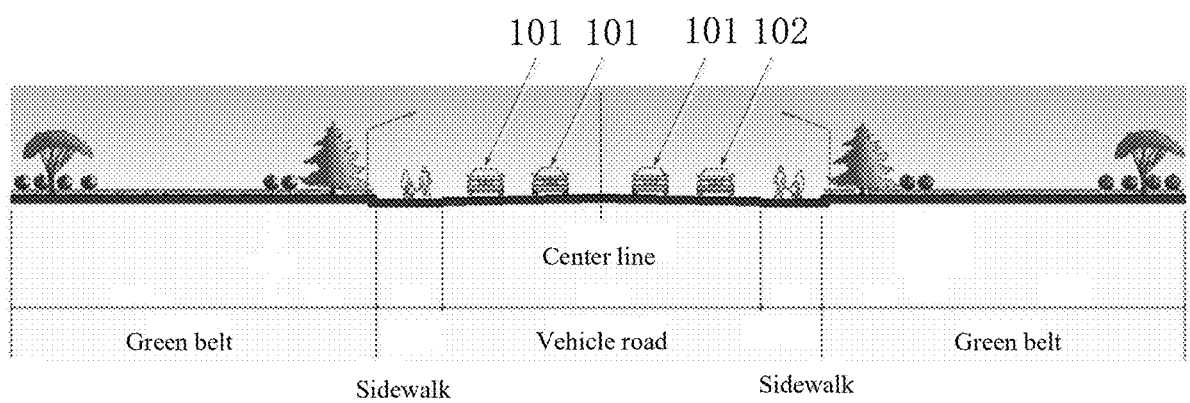
FIG. 1 is a schematic diagram of a simulation scene provided by an embodiment of the present disclosure.

FIG. 1 is a schematic diagram of a simulation scene provided by an embodiment of the present disclosure. As shown in FIG. 1, the simulation scene may include, but is not limited to: static objects such as green belts, sidewalks, vehicle roads, street lamps, trees and other facilities in a real environment; and at least one virtual vehicle 101, a smart driving vehicle 102, pedestrians and other dynamic objects.

The virtual vehicle 101 may include: a wayfinding system and other systems for driving. In some embodiments, the virtual vehicle 101 may include: a wayfinding system, a perceptive system, a decision making system, a control system and other systems for driving.

The wayfinding system is used to construct a road network topology, and finds ways based on the built road network topology. In some embodiments, the wayfinding system is used to obtain a high-precision map and build the road network topology based on the high-precision map. The high-precision map is a geographic map used in the field of smart driving, and the high-precision map is a map describing the simulation scene. Compared with traditional maps, the high-precision map is different in the following aspects: 1) the high-precision map includes a large amount of driving assistance information, such as accurate three-dimensional representation depended on road networks, including intersections and road sign positions; 2) the high-precision map further includes a large amount of semantic information, such as reporting the meanings of different colors on traffic lights, indicating a speed limit of a road, and a starting position of a left-turn lane; and 3) the high-precision map can achieve centimeter-level precision to ensure the safe driving of the smart driving vehicle. Therefore, a wayfinding path generated by the wayfinding system can provide richer planning decision-making basis for the decision making system, such as a number, a width and a direction of lanes in the current position, and positions of various traffic appendages.

The perceptive system is used for Collision Detection. In some embodiments, the perceptive system is used to perceive obstacles in the simulation scene.

The decision making system is used to decide a driving behavior of the virtual vehicle 101 via a preset Behavior Tree based on the wayfinding path generated by the wayfinding system, the obstacles perceived by the perceptive system and kinematic information of the virtual vehicle 101. The kinematic information, for example, includes, but is not limited to, speed, acceleration and other information related to movement.

The control system is used to control the driving of the virtual vehicle 101 based on the driving behavior decided by the decision making system, and feed the kinematic information of the virtual vehicle 101 back to the decision making system.

In some embodiments, the division of each system in the virtual vehicle 101 is only a logical function division, and there may be other division modes in actual implementation. For example, the function of the wayfinding system may be integrated into the perceptive system, the decision making system or the control system; any two or more systems may also be realized as one system; and any one system may also be divided into multiple subsystems. It may be understood that each system or subsystem can be realized by electronic hardware or a combination of computer software and electronic hardware. Whether the functions are executed by hardware or software depends on particular applications and design constraint conditions of the technical solutions. Those skilled in the art can use different methods for each specific application to realize the described functions.

The smart driving vehicle 102 at least includes a sensor group and a smart driving system. The sensor group is used for collecting data of an external environment of the vehicle and detecting position data of the vehicle. In some embodiments, the sensor group is also used to collect kinetic data of the vehicle. The smart driving system is used to acquire data of the sensor group, conduct environmental sensing and vehicle positioning based on the data of the sensor group, perform path planning and decision making based on environmental perception information and vehicle positioning information, and generate a vehicle control instruction based on the planned path, so as to control the vehicle to drive along the planned path.

It should be noted that both the virtual vehicle 101 and the smart driving vehicle 102 102 are generated in the simulation scene, and are not real vehicles, so the virtual vehicle 101 and the smart driving vehicle 102 may be controlled to drive by a background processor. The background processor may be a server, a computer, a tablet computer and other hardware devices with processing functions.

Figure 2:
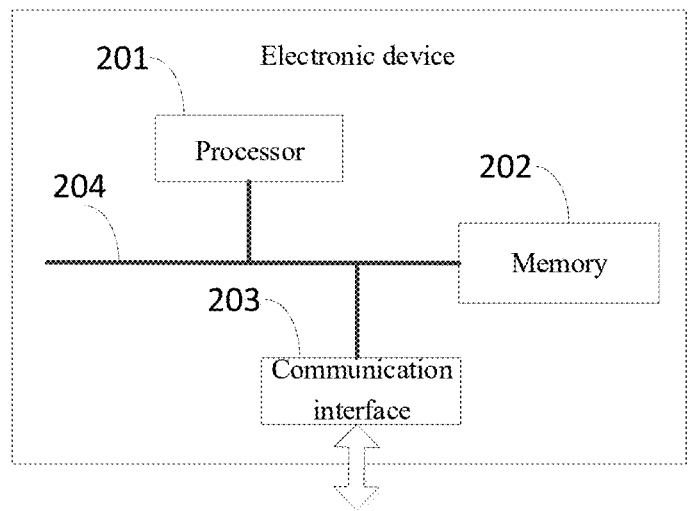
FIG. 2 is a block diagram of an electronic device provided by an embodiment of the present disclosure.

FIG. 2 is a block diagram of an electronic device provided by an embodiment of the present disclosure. The electronic device may support the operation of a simulation system.

The simulation system may provide a simulation scene, generate a virtual vehicle and provide other functions for simulation. The simulation system may be a simulation system based on a simulation engine.

As shown in FIG. 2, the electronic device includes at least one processor 201, at least one memory 202 and at least one communication interface 203. Various components in the electronic device are coupled together through a bus system 204. The communication interface 203 is used for information transfer with external devices. It can be understood that the bus system 204 is configured to realize communication connection between these components. The bus system 204 further includes a power bus, a control bus, and a status signal bus in addition to a data bus. However, for the sake of clarity, various buses are designated as the bus system 204 in FIG. 2.

It can be understood that the memory 202 in this embodiment may be a volatile memory or a non-volatile memory, or may include both volatile and non-volatile memories.

In some embodiments, the memory 202 is stored with the following elements, executable modules or data structures, or subsets thereof, or their extensions: an operating system and an application program.

The operating system includes various system programs, such as a framework layer, a core library layer, a driver layer, and the like, which are used to realize various basic services and handle hardware-based tasks. The application program may include various application programs, such as a Media Player, a Browser (Browser), and the like, for implementing various application services. The program for implementing the simulation scene image generation method provided by an embodiment of the present disclosure may be included in the application program.

In the embodiment of the present disclosure, the processor 201 is used to execute the steps of each embodiment of the simulation scene image generation method provided by an embodiment of the present disclosure by calling a program or instruction stored in the memory 202, specifically, a program or instruction stored in the application program.

The simulation scene image generation method provided by an embodiment of the present disclosure may be applied to the processor 201 or realized by the processor 201. The processor 201 may be an integrated circuit chip with a signal processing capacity. In the implementation process, the steps in the foregoing methods may be completed using an integrated logic circuit of hardware or an instruction in a form of software in the processor 201. The above processor 201 may be a general-purpose processor, a Digital Signal Processor (DSP), an Application Specific Integrated Circuit (ASIC), a Field-Programmable Gate Array (FPGA) or other programmable logic device, a discrete gate, or a transistor logic device, and a discrete hardware assembly. The general-purpose processor may be a microprocessor or the processor may be any conventional processor, or the like.

The steps of the simulation scene image generation method provided by an embodiment of the present disclosure may be directly executed and accomplished by means of a hardware decoding processor or may be executed and accomplished using a combination of hardware and software units in the decoding processor. The software unit may be located in a mature storage medium in the art, such as a random access memory, a flash memory, a read-only memory, a programmable read-only memory, or an electrically erasable programmable memory, a register, and the like. The storage medium is located in the memory 202. The processor 201 reads information from the memory 202 and completes the steps of the foregoing method in combination with the hardware of the processor.

Figure 3:
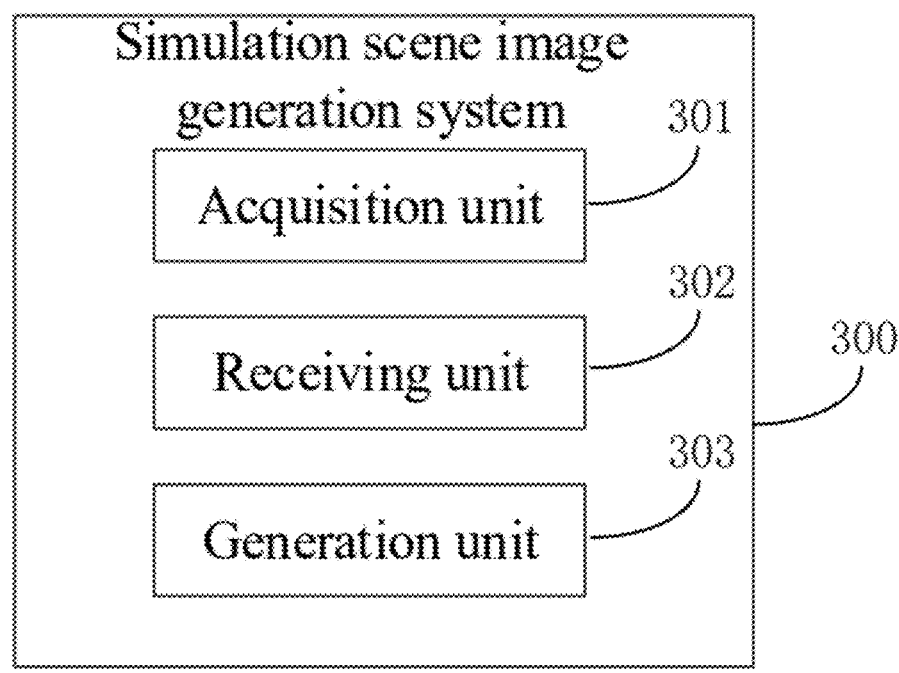
FIG. 3 is a block diagram of a simulation scene image generation system provided by an embodiment of the present disclosure.

FIG. 3 is a block diagram of a simulation scene image generation system 300 provided by an embodiment of the present disclosure. In some embodiments, the simulation scene image generation system 300 may be implemented as a system running in the electronic device shown in FIG. 2, or a part of the simulation system running in the electronic device. In some embodiments, the simulation scene image generation system may be stored in the memory 202 of the electronic device shown in FIG. 2. The processor 201 in FIG. 2 calls the simulation scene image generation system 300 stored in the memory 202 to realize the functions of each unit included in the simulation scene image generation system 300. In some embodiments, the simulation scene image generation system 300 may be applied to the processor 201 of the electronic device shown in FIG. 2 or implemented by the processor 201. Each unit of the simulation scene image generation system 300 may be completed using an integrated logic circuit of hardware or an instruction in a form of software in the processor 201.

As shown in FIG. 3, the simulation scene image generation system 300 may be divided into a plurality of units, for example, including, but not limited to: an acquisition unit 301, a receiving unit 302 and a generation unit 303.

The acquisition unit 301 is configured to acquire semantic segmentation information and instance segmentation information of a white blank 3D environment model. The white blank 3D environment model may be understood as a scene model without adding attribute information such as color, texture and illumination. In some embodiments, the white blank 3D environment model is established by a simulation engine, and the semantic segmentation information and the instance segmentation information of the white blank 3D environment model are generated by the simulation engine based on the white blank 3D environment model. For example, the white blank 3D environment model is established manually in the simulation engine, and does not need to manually add attribute information such as color, texture and illumination. The simulation engine can automatically generate the semantic segmentation information and the instance segmentation information based on the white blank 3D environment model.

In some embodiments, the semantic segmentation information is used to distinguish or describe different types of objects in the simulation scene: people, vehicles, animals, buildings, or the like; and the instance segmentation information is used to distinguish or describe each object in the simulation scene: different people, different vehicles, different animals, different buildings, or the like. That is, for one object in the simulation scene, the semantic segmentation information indicates whether the object is a person or a vehicle; if the object is a vehicle, the instance segmentation information indicates whether the vehicle is Audi or Volkswagen; and the instance text information indicates whether the vehicle is a white vehicle or a black vehicle.

The receiving unit 302 is configured to receive the instance text information of the white blank 3D environment model. The instance text information is editable information and used for describing an instance attribute. By changing a content of the instance text information, instance attributes are edited, and different instance attributes correspond to different instances. In some embodiments, the instance text information of the white blank 3D environment model is manually input, and in the process of manually inputting the instance text information, the content of the instance text information may be edited, and the receiving unit 302 receives the manually input instance text information. In this embodiment, since the instance text information is used to describe the instance attributes, the instance text information is set as editable information, thus realizing the editability of the instance attributes. Therefore, the simulation scene is a scene with editable instance attributes. In some embodiments, the instance attribute may include, but are not limited to, color, texture, illumination, and the like.

The generation unit 303 is configured to generate a simulation scene image based on the semantic segmentation information, the instance segmentation information, the instance text information and a pre-trained Generative Adversarial Network GAN). In some embodiments, the instance text information is not directly used as input of the generative adversarial network, but the generation unit 303 generates a feature map based on the instance text information and at least one real image corresponding to the white blank 3D environment model. Real images are only provided during training. Therefore, the generation unit 303 generates the simulation scene image based on the semantic segmentation information, the instance segmentation information and the feature map via the pre-trained generative adversarial network. In some embodiments, the generation unit 303 cascades the semantic segmentation information, the instance segmentation information and the feature map (essentially vector cascade, for example, cascade in a channel dimension, or add elements correspondingly) and then inputs the cascading result into the pre-trained generative adversarial network to generate the simulation scene image.

In this embodiment, the feature map is input into the generative adversarial network to adjust the color, texture, illumination and other attributes of the instances in the scene. In addition, the simulation scene image generated by the generation unit 303 is a high-resolution image, and the simulation scene is a high-resolution scene, which is convenient for technology exploration and technology verification testing in the process of artificial intelligence technology research and development.

In some embodiments, the generation unit 303 generates the feature map based on the instance text information and the at least one real image corresponding to the white blank 3D environment model, particularly including: carrying out embedding processing and conditioning augmentation processing on the instance text information to obtain a processing result; encoding the at least one real image corresponding to the white blank 3D environment model to obtain hidden variables corresponding to each real image, wherein the hidden variables may be understood as intermediate variables, and one image corresponds to one hidden variable; sampling the hidden variables corresponding to each real image to obtain a sampling result, wherein instance attribute information in the simulation scene is adjusted by sampling the hidden variables to realize diversification of the simulation scene image; and decoding the processing result and the sampling result to generate the feature map.

In some embodiments, the generation unit 303 carries out the embedding processing and the conditioning augmentation processing on the instance text information to obtain the processing result, particularly including: inputting the instance text information into a pre-trained embedding (Embedding) network, and obtaining the processing result from output of the embedding network via a pre-trained conditioning augmentation (Conditioning Augmentation) network. The embedding network and the conditioning augmentation network are both neural networks, and network parameters are obtained by pre-training.

In some embodiments, the generation unit generation unit 303 inputs the at least one real image corresponding to the white blank 3D environment model into an encoder of a pre-trained autoencoder network for encoding processing to obtain the hidden variables corresponding to each real image; the autoencoder network samples the hidden variables corresponding to each real image to obtain the sampling result; and the decoder of the autoencoder network decodes the processing result and the sampling result to generate the feature map. In some embodiments, the autoencoder network is a variational autoencoder network.

Figure 5:
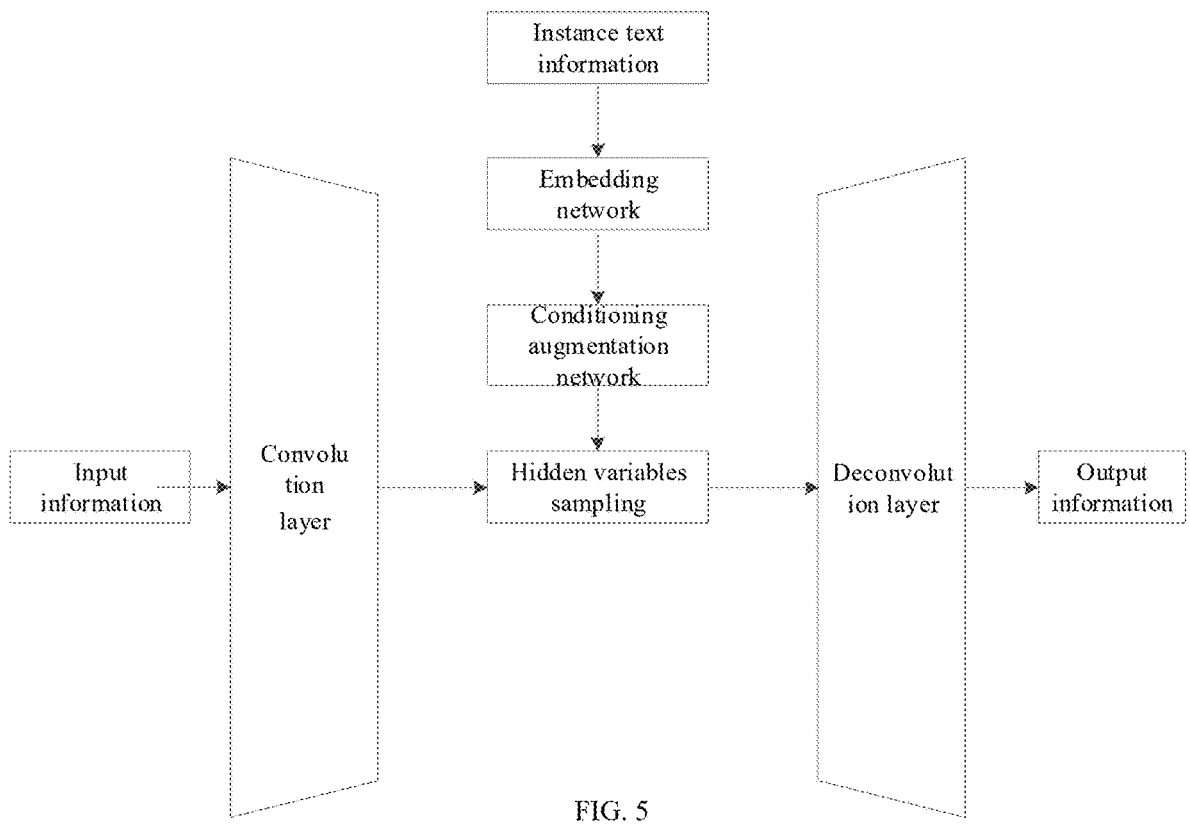
FIG. 5 is an architecture diagram of an autoencoder network provided by an embodiment of the present disclosure.

In some embodiments, architecture of the autoencoder network is shown in FIG. 5, including a convolution layer and a deconvolution layer, wherein the convolution layer may be understood as an encoder of the autoencoder network, and the deconvolution layer may be understood as a decoder of the autoencoder network. Input information of the autoencoder network is at least one real image corresponding to the white blank 3D environment model, that is, input of the convolution layer of the autoencoder network is at least one real image corresponding to the white blank 3D environment model. Output information of the autoencoder network is the feature map, that is, output of the deconvolution layer of the autoencoder network is the feature map.

In FIG. 5, the instance text information is input into the pre-trained embedding network, and output of the embedding network is a set of low-dimensional vectors. The processing result is obtained from the output of the embedding network via a pre-trained conditioning augmentation network. The autoencoder network samples the hidden variables corresponding to each real image to obtain the sampling result. The processing result and the sampling result are cascaded (essentially vector cascade, for example, cascade in a channel dimension, or add elements correspondingly), and then input into the deconvolution layer of the autoencoder network for decoding to generate the feature map.

In some embodiments, the generative adversarial network used in the generation unit 303 includes a generative network and a discriminative network, wherein the generative network is composed of a plurality of nested generators, wherein the generator includes a convolution layer and a deconvolution layer, and output of the last layer of feature map of the deconvolution layer of the internally nested generator is served as input of the deconvolution layer of the externally nested generator.

It should be noted that, since the discriminative network is mainly used to train the generative network, after the training of the generative network is completed, the simulation scene image may be generated independently. Therefore, in the following, when describing a function of the generative network, the generative adversarial network is used instead of the generative network, that is, the generative adversarial network generates the simulation scene image. Those skilled in the art can understand that the generative network of the generative adversarial network generates the simulation scene image. When describing the joint training, mentioning the discriminative network alone does not mean that the discriminative network does not belong to the generative adversarial network.

In some embodiments, the generation unit 303 is specifically configured to: input the semantic segmentation information, the instance segmentation information and the feature map into the convolution layer of the generator in an outermost layer of the generative adversarial network; down-sample the semantic segmentation information, the instance segmentation information and the feature map, and then input the down-sampling result to the convolution layers of the generators in an inner layer of the generative adversarial network; and output, by the deconvolution layer of the generator in the outermost layer of the generative adversarial network, the simulation scene image. Down-sampling processing multiples corresponding to different generators in the inner layer may be different. In this embodiment, input of the internally nested generator needs to be down-sampled, such that an output resolution is reduced, thus paying attention to overall output information. The output of the deconvolution layer of the generator in the outermost layer is the output of the generative adversarial network, which has high resolution and pays attention to detailed output information. On the whole, the simulation scene image generated by the generative adversarial network pays attention to both the whole and the details.

Figure 6:
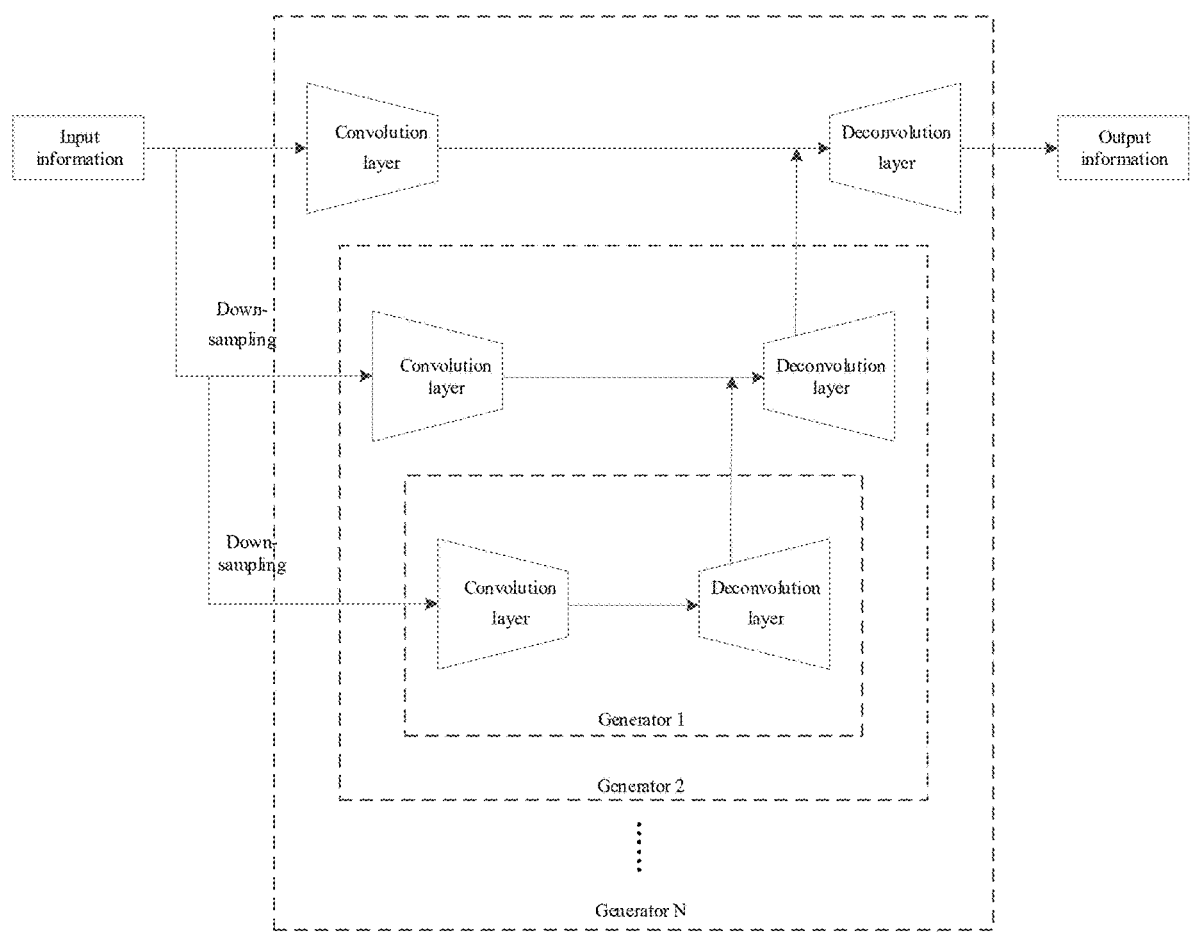
FIG. 6 is an architecture diagram of a generative adversarial network provided by an embodiment of the present disclosure.

In some embodiments, as shown in FIG. 6, an architecture of the generative adversarial network is made up of N (N≥3) generators which are nested and respectively named as generator 1, generator 2, . . . , generator N from inside to outside. Each generator includes a convolution layer and a deconvolution layer. Input information of the generative adversarial network is the semantic segmentation information, the instance segmentation information and the feature map. Output information of the generative adversarial network is the simulation scene image, that is, output of the deconvolution layer of the generator N is the simulation scene image.

In FIG. 6, taking N=3 as an example, the input information of the generative adversarial network is input to the convolution layer of the generator N. The input information of the generative adversarial network is down-sampled and then input to a convolution layer of a generator 2. The input information of the generative adversarial network is down-sampled again and then input to a convolution layer of a generator 1. The purpose of down-sampling is to reduce the resolution, for example, a reduction ratio is ½×½. If output of the generator N is a resolution of 200×200, then output of the generator 2 is a resolution of 100×100 and output of the generator 1 is a resolution of 50×50. It can be seen that the generator N has a high resolution and pays more attention to details; while the generator 2 and the generator 1 have low resolutions and pay more attention to the whole. Therefore, high-definition images output by the generative adversarial network are more reasonable, which pay attention to both the whole and the details.

In some embodiments, the generative adversarial network, the embedding network, the conditioning augmentation network and the autoencoder network used by the generation unit 303 are obtained through joint training. In some embodiments, the joint training may include: acquiring semantic segmentation information, instance segmentation information, instance text information and a sample image of a sample scene; and carrying out joint training based on the semantic segmentation information, the instance segmentation information, the instance text information and the sample image.

In some embodiments, the generation unit 303 uses the generative adversarial network, the embedding network, the conditioning augmentation network and the autoencoder network to carry out joint training based on the semantic segmentation information, the instance segmentation information, the instance text information and the sample image, particularly including:

inputting the instance text information into the embedding network, and obtaining processing result by inputting output of the embedding network to the conditioning augmentation network; inputting the sample image into the encoder of the autoencoder network for encoding processing to obtain the hidden variables corresponding to each sample image; sampling, by the autoencoder network, the hidden variables corresponding to each sample image to obtain the sampling result; decoding, by the decoder of the autoencoder network, the processing result and the sampling result to generate the feature map; inputting the semantic segmentation information, the instance segmentation information and the feature map into the convolution layer of the generator in an outermost layer of the generative adversarial network; down-sampling the semantic segmentation information, the instance segmentation information and the feature map, and then inputting the down-sampling result to the convolution layers of the generators in an inner layer of the generative adversarial network; outputting, by the deconvolution layer of the generator in the outermost layer of the generative adversarial network, a generated image; and training the generated image, the sample image, the semantic segmentation information, the instance segmentation information and the feature map via the discriminative network.

In some embodiments, the generated images output by the generative adversarial network are fake pictures, and as training data, feature values thereof are labeled as "fake" to indicate that these pictures are randomly generated pictures rather than real pictures. Relatively speaking, the sample image is a real shot picture, and a feature value thereof may be marked as "real". The generated image, the sample image, the semantic segmentation information, the instance segmentation information and the feature map are iterated continuously via the discriminative network, such that the discriminative network can judge the real picture and the fake picture more accurately, and then feed back to the generative adversarial network, so that the generative adversarial network can generate pictures that may be taken as real pictures.

As the generative adversarial network is proved to be convergent, the discriminative network may continue to train until a training target is met through multiple iterations when a judgment probability value of each discriminator is not converged to 0.5. The "training target" may be a preset target of whether the generated pictures of the generative adversarial network satisfy the requirements. In an embodiment, due to a convergence property of function, the training target of the generative adversarial network may be, for example, that the feature value of the predicted picture satisfies a designated requirement, such as approaching 0.5. The training is stopped after it is judged that the judgment probability value of each discriminator is converged to 0.5.

In some embodiments, the discriminative network is composed of a plurality of discriminators in cascade; input of the highest level discriminator is the generated image, the sample image, the semantic segmentation information, the instance segmentation information and the feature map; and the generated image, the sample image, the semantic segmentation information, the instance segmentation information and the feature map are down-sampled and then input to a lower discriminator; wherein different levels of discriminators may correspond to different down-sampling processing multiples.

Figure 7:
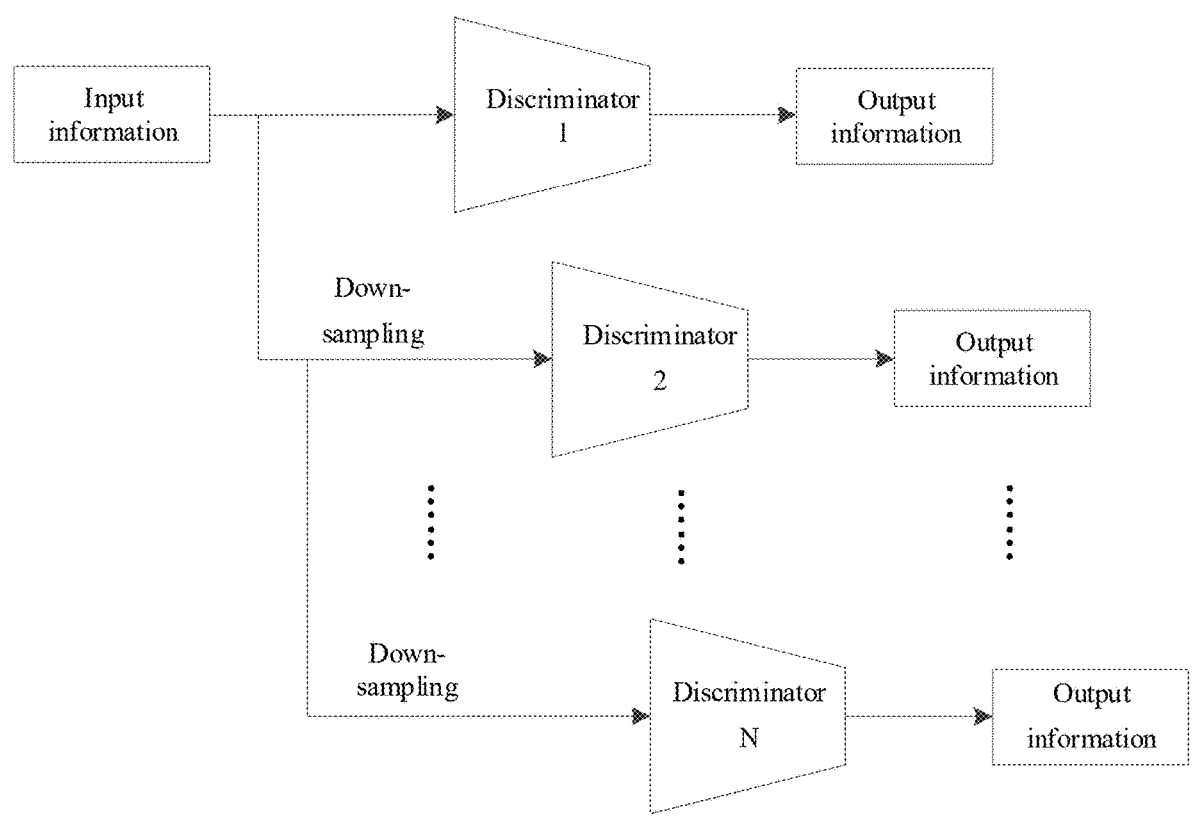
FIG. 7 is an architecture diagram of a discriminative network provided by an embodiment of the present disclosure.

In some embodiments, as shown in FIG. 7, an architecture of the generative adversarial network is made up of N (N≥3) generators which are cascaded and respectively named as generator 1, generator 2, . . . , generator N from top to bottom. Input information of the discriminative network is the generated image, the sample image, the semantic segmentation information, the instance segmentation information and the feature map. Output information of the discriminative network is a judgment probability value.

In FIG. 7, taking N=3 as an example, the input information of the discriminative network is input to a discriminator 1. The input information of the discriminative network is down-sampled and then input to a discriminator 2. The input information of the discriminative network is down-sampled again and then input to a discriminator N. If the judgment probability values output by the discriminator 1, the discriminator 2 and the discriminator 3 are all converged to 0.5, the joint training is ended.

In some embodiments, the simulation scene image generation system 300 may be a software system, a hardware system or a system combining hardware and software. For example, the simulation scene image generation system 300 is a software system running on an operating system, and a hardware system of an electronic device is a hardware system that supports the operation of the operating system.

In some embodiments, the division of each unit in the simulation scene image generation system 300 is only a logical function division, and there may be other division modes in actual implementation. For example, the acquisition unit 301, the receiving unit 302 and the generation unit 303 may be realized as one unit; the acquisition unit 301, the receiving unit 302, or the generation unit 303 may also be divided into a plurality of subunits. It may be understood that each unit or sub-unit can be realized by electronic hardware or a combination of computer software and electronic hardware. Whether the functions are executed by hardware or software depends on particular applications and design constraint conditions of the technical solutions. Those skilled in the art can use different methods for each specific application to realize the described functions.

Figure 4:
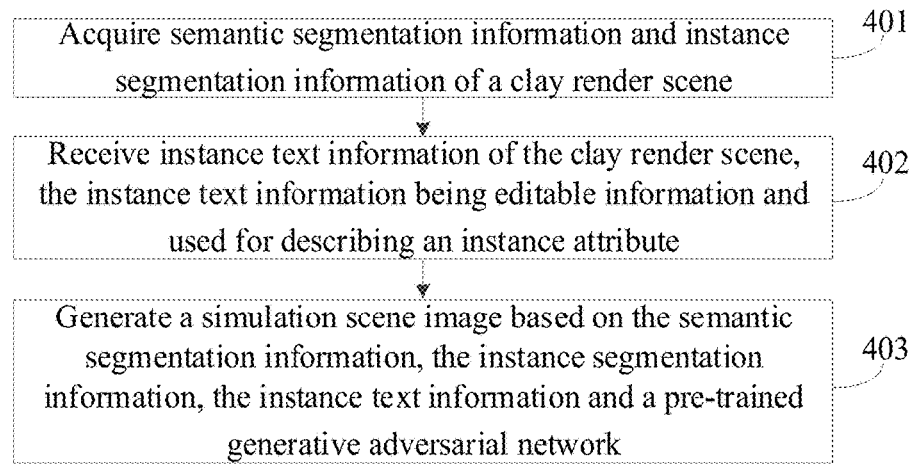
FIG. 4 is a flowchart of a simulation scene image generation method provided by an embodiment of the present disclosure.

FIG. 4 is a flowchart of a simulation scene image generation method provided by an embodiment of the present disclosure. An executing body of the method is an electronic device, and in some embodiments, the executing body of the method is a simulation scene image generation system running in the electronic device; or, the executing body of the method is a simulation system running in the electronic device, wherein the simulation scene image generation system may be a part of the simulation system.

As shown in FIG. 4, the simulation scene image generation method may include, but is not limited to the following steps 401 to 403.

At 401, semantic segmentation information and instance segmentation information of a white blank 3D environment model are acquired. The white blank 3D environment model may be understood as a scene model without adding attribute information such as color, texture and illumination. In some embodiments, the white blank 3D environment model is established by a simulation engine, and the semantic segmentation information and the instance segmentation information of the white blank 3D environment model are generated by the simulation engine based on the white blank 3D environment model. For example, the white blank 3D environment model is established manually in the simulation engine, and does not need to manually add attribute information such as color, texture and illumination. The simulation engine can automatically generate the semantic segmentation information and the instance segmentation information based on the white blank 3D environment model.

In some embodiments, the semantic segmentation information is used to distinguish or describe different types of objects in the simulation scene: people, vehicles, animals, buildings, or the like; and the instance segmentation information is used to distinguish or describe each object in the simulation scene: different people, different vehicles, different animals, different buildings, or the like. That is, for one object in the simulation scene, the semantic segmentation information indicates whether the object is a person or a vehicle; if the object is a vehicle, the instance segmentation information indicates whether the vehicle is Audi or Volkswagen; and the instance text information indicates whether the vehicle is a white vehicle or a black vehicle.

At 402, instance text information of the white blank 3D environment model is received. The instance text information is editable information and used for describing an instance attribute. By changing a content of the instance text information, instance attributes are edited, and different instance attributes correspond to different instances. In some embodiments, the instance text information of the white blank 3D environment model is manually input, and in the process of manually inputting the instance text information, the content of the instance text information may be edited, and the manually input instance text information is received at step 402. In this embodiment, since the instance text information is used to describe the instance attributes, the instance text information is set as editable information, thus realizing the editability of the instance attributes. Therefore, the simulation scene is a scene with editable instance attributes. In some embodiments, the instance attribute may include, but are not limited to, color, texture, illumination, and the like.

At 403, a simulation scene image is generated based on the semantic segmentation information, the instance segmentation information, the instance text information and a pre-trained generative adversarial network. In some embodiments, the instance text information is not directly used as input of the generative adversarial network, but a feature map is generated based on the instance text information and at least one real image corresponding to the white blank 3D environment model. Then, the simulation scene image is generated based on the semantic segmentation information, the instance segmentation information and the feature map via the pre-trained generative adversarial network. In some embodiments, the semantic segmentation information, the instance segmentation information and the feature map are cascaded (essentially vector cascade) and then input to the pre-trained generative adversarial network to generate the simulation scene image.

In this embodiment, the feature map is input into the generative adversarial network to adjust the color, texture, illumination and other attributes of the instances in the scene. In addition, the simulation scene image generated is a high-resolution image, and the simulation scene is a high-resolution scene, which is convenient for technology exploration and technology verification testing in the process of artificial intelligence technology research and development.

In some embodiments, the generating the feature map based on the instance text information and the at least one real image corresponding to the white blank 3D environment model, particularly includes: carrying out embedding processing and conditioning augmentation processing on the instance text information to obtain a processing result; encoding the at least one real image corresponding to the white blank 3D environment model to obtain hidden variables corresponding to each real image, wherein the hidden variables may be understood as intermediate variables, and one image corresponds to one hidden variable; and sampling the hidden variables corresponding to each real image to obtain a sampling result, wherein instance attribute information in the simulation scene is adjusted by sampling the hidden variables to realize diversification of the simulation scene image; and decoding the processing result and the sampling result to generate the feature map.

In some embodiments, the carrying out the embedding processing and the conditioning augmentation processing on the instance text information to obtain the processing result, particularly includes: inputting the instance text information into a pre-trained embedding (Embedding) network, and obtaining the processing result from output of the embedding network via a pre-trained conditioning augmentation (Conditioning Augmentation) network. The embedding network and the conditioning augmentation network are both neural networks, and network parameters are obtained by pre-training.

In some embodiments, the at least one real image corresponding to the white blank 3D environment model is input into an encoder of a pre-trained autoencoder network for encoding processing to obtain the hidden variables corresponding to each real image; the autoencoder network samples the hidden variables corresponding to each real image to obtain the sampling result; and the decoder of the autoencoder network decodes the processing result and the sampling result to generate the feature map. In some embodiments, the autoencoder network is a variational autoencoder network.

In some embodiments, architecture of the autoencoder network is shown in FIG. 5, including a convolution layer and a deconvolution layer, wherein the convolution layer may be understood as an encoder of the autoencoder network, and the deconvolution layer may be understood as a decoder of the autoencoder network. Input information of the autoencoder network is at least one real image corresponding to the white blank 3D environment model, that is, input of the convolution layer of the autoencoder network is at least one real image corresponding to the white blank 3D environment model. Output information of the autoencoder network is the feature map, that is, output of the deconvolution layer of the autoencoder network is the feature map.

In FIG. 5, the instance text information is input into the pre-trained embedding network, and output of the embedding network is a set of low-dimensional vectors. The processing result is obtained from the output of the embedding network via a pre-trained conditioning augmentation network. The autoencoder network samples the hidden variables corresponding to each real image to obtain the sampling result. The processing result and the sampling result are cascaded (essentially vector cascade) and then input to the deconvolution layer of the autoencoder network for decoding to generate the feature map.

In some embodiments, the generative adversarial network includes a generative network and a discriminative network, wherein the generative network is composed of a plurality of nested generators, wherein the generator includes a convolution layer and a deconvolution layer, and output of the last layer of feature map of the deconvolution layer of the internally nested generator is served as input of the deconvolution layer of the externally nested generator.

It should be noted that, since the discriminative network is mainly used to train the generative network, after the training of the generative network is completed, the simulation scene image may be generated independently. Therefore, in the following, when describing a function of the generative network, the generative adversarial network is used instead of the generative network, that is, the generative adversarial network generates the simulation scene image. Those skilled in the art can understand that the generative network of the generative adversarial network generates the simulation scene image. When describing the joint training, mentioning the discriminative network alone does not mean that the discriminative network does not belong to the generative adversarial network.

In some embodiments, the semantic segmentation information, the instance segmentation information and the feature map are input into the convolution layer of the generator in an outermost layer of the generative adversarial network; the semantic segmentation information, the instance segmentation information and the feature map are down-sampled and then input to the convolution layers of the generators in an inner layer of the generative adversarial network; and the deconvolution layer of the generator in the outermost layer of the generative adversarial network outputs the simulation scene image. Down-sampling processing multiples corresponding to different generators in the inner layer may be different. In this embodiment, input of the internally nested generator needs to be down-sampled, such that an output resolution is reduced, thus paying attention to overall output information. The output of the deconvolution layer of the generator in the outermost layer is the output of the generative adversarial network, which has high resolution and pays attention to detailed output information. On the whole, the simulation scene image generated by the generative adversarial network pays attention to both the whole and the details.

In some embodiments, as shown in FIG. 6, an architecture of the generative adversarial network is made up of N (N≥3) generators which are nested and respectively named as generator 1, generator 2, . . . , generator N from inside to outside. Each generator includes a convolution layer and a deconvolution layer. Input information of the generative adversarial network is the semantic segmentation information, the instance segmentation information and the feature map. Output information of the generative adversarial network is the simulation scene image, that is, output of the deconvolution layer of the generator N is the simulation scene image.

In FIG. 6, taking N=3 as an example, the input information of the generative adversarial network is input to the convolution layer of the generator N. The input information of the generative adversarial network is down-sampled and then input to a convolution layer of a generator 2. The input information of the generative adversarial network is down-sampled again and then input to a convolution layer of a generator 1. The purpose of down-sampling is to reduce the resolution, for example, a reduction ratio is ½×½. If output of the generator N is a resolution of 200×200, then output of the generator 2 is a resolution of 100×100 and output of the generator 1 is a resolution of 50×50. It can be seen that the generator N has a high resolution and pays more attention to details; while the generator 2 and the generator 1 have low resolutions and pay more attention to the whole. Therefore, high-definition images output by the generative adversarial network are more reasonable, which pay attention to both the whole and the details.

In some embodiments, the generative adversarial network, the embedding network, the conditioning augmentation network and the autoencoder network are obtained by joint training. In some embodiments, the joint training may include: acquiring semantic segmentation information, instance segmentation information, instance text information and a sample image of a sample scene; and carrying out joint training based on the semantic segmentation information, the instance segmentation information, the instance text information and the sample image.

In some embodiments, the generative adversarial network, the embedding network, the conditioning augmentation network and the autoencoder network carry out joint training based on the semantic segmentation information, the instance segmentation information, the instance text information and the sample image, particularly including:

inputting the instance text information into the embedding network, and obtaining processing result by inputting output of the embedding network to the conditioning augmentation network; inputting the sample image into the encoder of the autoencoder network for encoding processing to obtain the hidden variables corresponding to each sample image; sampling, by the autoencoder network, the hidden variables corresponding to each sample image to obtain the sampling result; decoding, by the decoder of the autoencoder network, the processing result and the sampling result to generate the feature map; inputting the semantic segmentation information, the instance segmentation information and the feature map into the convolution layer of the generator in an outermost layer of the generative adversarial network; down-sampling the semantic segmentation information, the instance segmentation information and the feature map and then inputting the down-sampling result to the convolution layers of the generators in an inner layer of the generative adversarial network; outputting, by the deconvolution layer of the generator in the outermost layer of the generative adversarial network, a generated image; and training the generated image, the sample image, the semantic segmentation information, the instance segmentation information and the feature map via the discriminative network.

In some embodiments, the generated images output by the generative adversarial network are fake pictures, and as training data, feature values thereof are labeled as "fake" to indicate that these pictures are randomly generated pictures rather than real pictures. Relatively speaking, the sample image is a real shot picture, and a feature value thereof may be marked as "real". The generated image, the sample image, the semantic segmentation information, the instance segmentation information and the feature map are iterated continuously via the discriminative network, such that the discriminative network can judge the real picture and the fake picture more accurately, and then feed back to the generative adversarial network, so that the generative adversarial network can generate pictures that may be taken as real pictures.

As the generative adversarial network is proved to be convergent, the discriminative network may continue to train until a training target is met through multiple iterations when a judgment probability value of each discriminator is not converged to 0.5. The "training target" may be a preset target of whether the generated pictures of the generative adversarial network satisfy the requirements. In an embodiment, due to a convergence property of function, the training target of the generative adversarial network may be, for example, that the feature value of the predicted picture satisfies a designated requirement, such as approaching 0.5. The training is stopped after it is judged that the judgment probability value of each discriminator is converged to 0.5.

In some embodiments, the discriminative network is composed of a plurality of discriminators in cascade; input of the highest level discriminator is the generated image, the sample image, the semantic segmentation information, the instance segmentation information and the feature map; and the generated image, the sample image, the semantic segmentation information, the instance segmentation information and the feature map are down-sampled and then input to a lower discriminator; wherein different levels of discriminators may correspond to different down-sampling processing multiples.

In some embodiments, as shown in FIG. 7, an architecture of the generative adversarial network is made up of N (N≥3) generators which are cascaded and respectively named as generator 1, generator 2, . . . , generator N from top to bottom. Input information of the discriminative network is the generated image, the sample image, the semantic segmentation information, the instance segmentation information and the feature map. Output information of the discriminative network is a judgment probability value.

In FIG. 7, taking N=3 as an example, the input information of the discriminative network is input to a discriminator 1. The input information of the discriminative network is down-sampled and then input to a discriminator 2. The input information of the discriminative network is down-sampled again and then input to a discriminator N. If the judgment probability values output by the discriminator 1, the discriminator 2 and the discriminator 3 are all converged to 0.5, the joint training is ended.

It should be noted that, for the sake of simple description, the fore-mentioned method embodiments are all expressed as a series of action combinations, but those skilled in the art can understand that the embodiments of the present disclosure are not limited by the described action sequences. According to the embodiments of the present disclosure, certain steps may be performed in other sequences or concurrently ("the acquiring the semantic segmentation information and the instance segmentation information of the white blank 3D environment model" and the "receiving the instance text information of the white blank 3D environment model" may be performed concurrently; and it may also be that the "receiving the instance text information of the white blank 3D environment model" may be performed first, and then the "the acquiring the semantic segmentation information and the instance segmentation information of the white blank 3D environment model" is performed). Moreover, those skilled in the art can understand that the embodiments described in the specification are all optional embodiments.

The embodiments of the present disclosure also provide a non-transient computer-readable storage medium, which stores programs or instructions, and the programs or instructions cause a computer to execute the steps of the various embodiments of the simulation scene image generation method, which will not be repeated here to avoid repeated descriptions.

It should be noted that the terms "including", "comprising" or any variations thereof are intended to embrace a non-exclusive inclusion, such that a process, a method, an article, or an apparatus including a series of elements, includes not only those elements but also includes other elements not expressly listed, or also incudes elements inherent to such process, method, article, or apparatus. In the absence of further limitation, an element defined by the phrase "including . . . " does not exclude the existence of additional identical elements in the process, method, article, or apparatus that includes the element.

Those skilled in the art can understand that although some embodiments described herein include some features included in other embodiments rather than other features, but combinations of features of different embodiments are meant to be within the scope of the present disclosure and form different embodiments.

Those skilled in the art can understand that the description of each embodiment has its own emphasis. For parts not detailed in one embodiment, please refer to the related description of other embodiments.

Although the embodiments of the present disclosure have been described with reference to the drawings, those skilled in the art can make various modifications and variations without departing from the spirit and scope of the present disclosure, and such modifications and variations all fall within the scope defined by the appended claims.

INDUSTRIAL APPLICABILITY

In the embodiments of the present disclosure, only the establishment of the white blank 3D environment model is required, so that the simulation scene image can be generated based on the semantic segmentation information and the instance segmentation information of the white blank 3D environment model, and attributes such as color, texture and illumination do not need to be refined in the process of establishing the scene, thereby improving a generation efficiency; moreover, the instance text information is editable, and different pieces of instance text information describe different instance attributes and correspond to different instances, such that the simulation scene is diversified, and has industrial applicability.

What is claimed is:

1. A simulation scene image generation method, comprising:
   acquiring semantic segmentation information and instance segmentation information of a white blank 3D environment model;
   receiving instance text information of the white blank 3D environment model, wherein the instance text information is editable information and used for describing an instance attribute; and
   generating a simulation scene image based on the semantic segmentation information, the instance segmentation information, the instance text information and a pre-trained generative adversarial network,
   wherein the step of generating the simulation scene image based on the semantic segmentation information, the instance segmentation information, the instance text information and the pre-trained generative adversarial network comprises:
   generating a feature map based on the instance text information and at least one real image corresponding to the white blank 3D environment model; and
   generating the simulation scene image based on the semantic segmentation information, the instance segmentation information and the feature map via the pre-trained generative adversarial network.

2. The simulation scene image generation method according to claim 1, wherein the white blank 3D environment model is established by a simulation engine, and the semantic segmentation information and the instance segmentation information of the white blank 3D environment model are generated by the simulation engine based on the white blank 3D environment model.

3. The simulation scene image generation method according to claim 1, wherein the step of generating the feature map based on the instance text information and the at least one real image corresponding to the white blank 3D environment model comprises:
   carrying out embedding processing and conditioning augmentation processing on the instance text information to obtain a processing result;
   encoding the at least one real image corresponding to the white blank 3D environment model to obtain hidden variables corresponding to each real image of the at least one real image;
   sampling the hidden variables corresponding to each real image to obtain a sampling result; and
   decoding the processing result and the sampling result to generate the feature map.

4. The simulation scene image generation method according to claim 3, wherein the step of carrying out the embedding processing and the conditioning augmentation processing on the instance text information to obtain the processing result comprises:
   inputting the instance text information into a pre-trained embedding network, and obtaining a processing result by inputting output of the pre-trained embedding network to a pre-trained conditioning augmentation network.

5. The simulation scene image generation method according to claim 4, wherein:
   inputting the at least one real image corresponding to the white blank 3D environment model into an encoder of a pre-trained autoencoder network for encoding processing to obtain the hidden variables corresponding to each real image;
   sampling, by the pre-trained autoencoder network, the hidden variables corresponding to each real image to obtain the sampling result; and
   decoding, by a decoder of the pre-trained autoencoder network, the processing result and the sampling result to generate the feature map.

6. The simulation scene image generation method according to claim 5, wherein the pre-trained generative adversarial network, the pre-trained embedding network, the pre-trained conditioning augmentation network and the pre-trained autoencoder network are obtained through joint training.

7. The simulation scene image generation method according to claim 6, wherein the joint training comprises:
   acquiring semantic segmentation information, instance segmentation information, instance text information and a sample image of a sample scene; and
   carrying out the joint training based on the semantic segmentation information, the instance segmentation information, the instance text information and the sample image.

8. The simulation scene image generation method according to claim 7, wherein the step of carrying out the joint training based on the semantic segmentation information, the instance segmentation information, the instance text information and the sample image comprises:
   inputting the instance text information into the pre-trained embedding network, and obtaining the processing result from the output of the pre-trained embedding network via the pre-trained conditioning augmentation network;
   inputting the sample image into the encoder of the pre-trained autoencoder network for encoding processing to obtain the hidden variables corresponding to each sample image;

sampling, by the pre-trained autoencoder network, the hidden variables corresponding to each sample image to obtain the sampling result;

decoding, by the decoder of the pre-trained autoencoder network, the processing result and the sampling result to generate the feature map;

inputting the semantic segmentation information, the instance segmentation information and the feature map into the convolution layer of the generator in an outermost layer of the pre-trained generative adversarial network;

down-sampling the semantic segmentation information, the instance segmentation information and the feature map, and then inputting the down-sampling result to the convolution layers of the generators in an inner layer of the pre-trained generative adversarial network;

outputting, by the deconvolution layer of the generator in the outermost layer of the pre-trained generative adversarial network, a generated image; and training the generated image, the sample image, the semantic segmentation information, the instance segmentation information and the feature map via a discriminative network.

9. The simulation scene image generation method according to claim 8, wherein the discriminative network comprises a plurality of discriminators in cascade;

input of a highest level discriminator is the generated image, the sample image, the semantic segmentation information, the instance segmentation information and the feature map; and the generated image, the sample image, the semantic segmentation information, the instance segmentation information and the feature map are down-sampled and then input to a lower-level discriminator; wherein different levels of discriminators correspond to different down-sampling processing multiples.

10. The simulation scene image generation method according to claim 1, wherein the pre-trained generative adversarial network comprises a plurality of nested generators, wherein each generator of the plurality of nested generators comprises a convolution layer and a deconvolution layer, and output of a last layer of feature map of the deconvolution layer of an internally nested generator of the plurality of nested generators is served as input of the deconvolution layer of an externally nested generator of the plurality of nested generators.

11. The simulation scene image generation method according to claim 10, wherein the step of generating the simulation scene image based on the semantic segmentation information, the instance segmentation information and the feature map via the pre-trained generative adversarial network comprises:

inputting the semantic segmentation information, the instance segmentation information and the feature map into the convolution layer of the generator in an outermost layer of the pre-trained generative adversarial network;

down-sampling the semantic segmentation information, the instance segmentation information and the feature map, and then inputting a down-sampling result to the convolution layers of the generators in an inner layer of the pre-trained generative adversarial network; wherein different generators in the inner layer correspond to different down-sampling processing multiples; and outputting, by the deconvolution layer of the generator in the outermost layer of the pre-trained generative adversarial network, the simulation scene image.

12. An electronic device, comprising a processor and a memory;

wherein the processor is configured for executing the steps of the simulation scene image generation method according to claim 1 by calling a program or instruction stored in the memory.

13. The electronic device according to claim 12, wherein in the simulation scene image generation method, the white blank 3D environment model is established by a simulation engine, and the semantic segmentation information and the instance segmentation information of the white blank 3D environment model are generated by the simulation engine based on the white blank 3D environment model.

14. The electronic device according to claim 12, wherein in the simulation scene image generation method, the step of generating the feature map based on the instance text information and the at least one real image corresponding to the white blank 3D environment model comprises:

carrying out embedding processing and conditioning augmentation processing on the instance text information to obtain a processing result;

encoding the at least one real image corresponding to the white blank 3D environment model to obtain hidden variables corresponding to each real image of the at least one real image;

sampling the hidden variables corresponding to each real image to obtain a sampling result; and decoding the processing result and the sampling result to generate the feature map.

15. The electronic device according to claim 14, wherein in the simulation scene image generation method, the step of carrying out the embedding processing and the conditioning augmentation processing on the instance text information to obtain the processing result comprises:

inputting the instance text information into a pre-trained embedding network, and obtaining a processing result by inputting output of the pre-trained embedding network to a pre-trained conditioning augmentation network.

16. The electronic device according to claim 15, wherein in the simulation scene image generation method, inputting the at least one real image corresponding to the white blank 3D environment model into an encoder of a pre-trained autoencoder network for encoding processing to obtain the hidden variables corresponding to each real image;

sampling, by the pre-trained autoencoder network, the hidden variables corresponding to each real image to obtain the sampling result; and decoding, by a decoder of the pre-trained autoencoder network, the processing result and the sampling result to generate the feature map.

17. The electronic device according to claim 12, wherein in the simulation scene image generation method, the pre-trained generative adversarial network comprises a plurality of nested generators, wherein each generator of the plurality of nested generators comprises a convolution layer and a deconvolution layer, and output of a last layer of feature map of the deconvolution layer of an internally nested generator of the plurality of nested generators is served as input of the deconvolution layer of an externally nested generator of the plurality of nested generators.

18. A non-transient computer-readable storage medium, wherein a program or instruction is stored on the non-transient computer-readable storage medium, and the program or instruction enables a computer to execute the steps of the simulation scene image generation method according to claim 1.

\* \* \* \* \*